Patented July 22, 1952

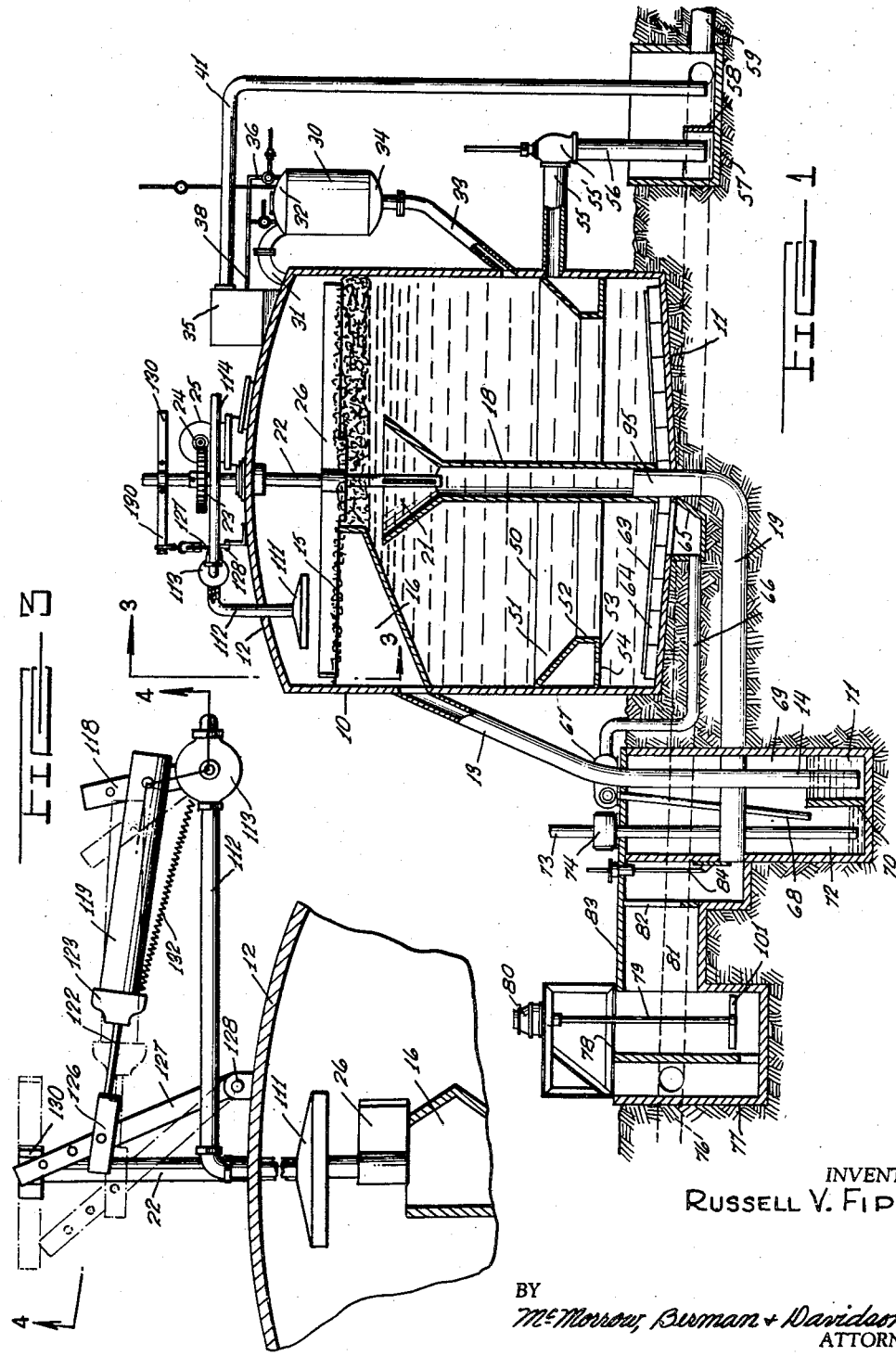

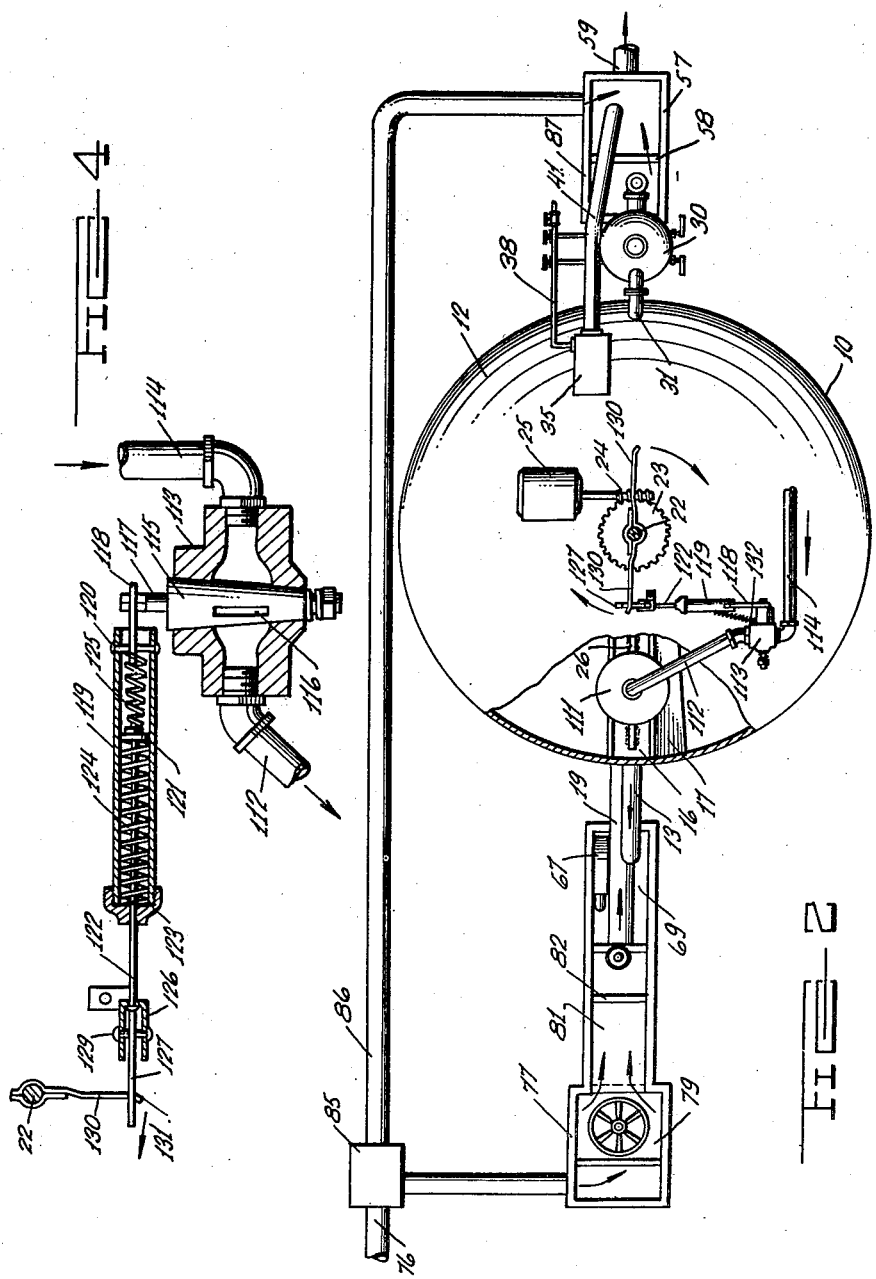

2,604,443

UNITED STATES PATENT OFFICE 2,604,443

SPRAYING SYSTEM FOR SLUDGE SEPARATORS

Russell V. Fipps, Lexington Park, Md.

Application October 18, 1949, Serial No. 122,027

3 Claims. (Cl. 210—3)

1

This invention relates to sewage-disposal plants, and more particularly to a plant employing a Vacuator of the type disclosed in Reissue Patent 22,701 to E. M. Kelly et al., reissued December 4, 1945.

As disclosed in the aforementioned reissue patent to Kelly et al., a Vacuator is an apparatus designed to take out of the raw sewage as much of the solids or raw sludge as possible. The sewage is first agitated and then drawn by vacuum up into the Vacuator chamber, and a large part of the solids float on the surface where said solids are scraped off into a collecting trough, from which the solids drop into a pit from which said solids are pumped to the digesters. The solids are scraped off by a scraper which revolves about in the Vacuator very slowly with the scraper arm passing over the trough at spaced intervals of time, for example, at 10-minute intervals. A spray or jet of water is required to assist the sludge in leaving the trough and to cause said sludge to drop into the pit. Prior to the present invention, a continuous jet of water has been employed and has been found to be not very effective. A main object of the present invention is to improve the efficiency of the apparatus, reduce the amount of water required, and to avoid excessive dilution of the sludge to be pumped into the digesters.

In accordance with the object of the present invention, an intermittent jet of water is employed which is operated automatically in accordance with the movements of the scraper arm, whereby the jet is turned on to provide a full head of water just in front of the scraper arm as the arm moves the sludge and is shut off after the arm has passed over the discharge edge of the sludge trough and after the sludge has been washed into the pit. An important object of the present invention is to provide a means for furnishing a heavy jet flow at the required time and only at such time, whereby the total amount of water flowing to the digester along with the sludge will not be excessive, and whereby the digester will thereby not be overloaded.

A still further object of the invention is to provide an improved apparatus of the Vacuator type wherein a given amount of solids may be removed from the sewage with a minimum amount of water employed in the spray jets, whereby maximum sewage-treating capacity is provided in a Vacuator having a given digester capacity.

Further objects and advantages of the invention will become apparent from the following description and claims, and from the accompanying drawings, wherein:

2

Figure 1 is a vertical sectional view of a Vacuator apparatus for separating and removing suspended matter from a liquid body, and employing intermittent jet means according to the present invention;

Figure 2 is a plan view of the apparatus of Figure 1, parts thereof being broken away;

Figure 3 is an enlarged cross-sectional detail view taken on line 3—3 of Figure 1;

Figure 4 is an enlarged cross-sectional detail view taken on line 4—4 of Figure 3.

Referring to the drawings, and more particularly to Figures 1 and 2, 10 represents a main tank, 11 its bottom or floor, 12 its closed roof or top, 13 a scum-discharge duct or pathway having a barometric or hydrostatic leg 14, 15 represents an elongated edge, dam or weir that is not normally submerged, 16 a funnel section of the scum-discharge duct 13 that supports the weir 15, and 17 a ramp leading up to the weir. 18 represents an upstanding draft tube, 19 a feed inlet pipe or conduit of which the draft tube forms a functional terminal. 20 represents a flared outlet section of the draft tube 18, 21 represents a spider therein by which the draft tube is supported from shaft 22 rotatably penetrating, in a gas-tight manner, the tank roof 12, which shaft is provided with a worm gear 23 that is rotated by a worm 24, driven by a motor 25. 26 indicates scum-raking arms extending substantially radially from the shaft 22, having scum sweeps carried by the arms 26 that are adapted for scum-sweeping cooperation with the ramp 17 and weir 15.

30 represents generally a supplemental or auxiliary tank or compartment, which, with its assembly, constitutes an arrangement for applying the effect of vacuum to the main tank 10, and also for controlling the height of the liquid level in the main tank. 31 indicates a freely-communicating passageway provided by a pipe extending between the upper section of the main tank and the upper section of the auxiliary or secondary tank 30. 32 indicates a closed top or roof on the secondary tank 30, while 33 indicates a liquid pathway or communicating pipe extending between the bottom 34 of the tank 30 and to the interior liquid-holding portion of the main tank 10.

35 indicates a wet-vacuum pumping means for sucking air or gas from the interior of the secondary tank 30 by such conduit means as pipes 36. Pipes 36 merge into a single pipe 38 leading to the pump 35. 41 indicates a discharge pipe line leading from the vacuum pump 35, as shown.

50 indicates baffling means within the main tank 10 forming a ring-like or annular effluent take-off system for the main tank, for shielding the withdrawn liquid from descending or settling solids at the place of withdrawal of the effluent liquid from the liquid body in the tank. This is preferably provided with a downwardly-inclined top member 51, a cylindrical member 52, a horizontal closure member 53 having apertures 54 therein located at intervals. 55 indicates a treated liquid, or effluent take-off discharge pipe valved at 55' that is provided with a barometric or hydrostatic leg 56 that dips into a basin or pool 57 formed by means of an adjustable dam or weir 58, over which liquid flows to discharge through effluent discharge pipe 59.

Figure 1 shows an assembly of sediment or sludge-raking mechanism supported from and rotating with the draft-tube 18. It comprises rake arm 63 extending generally outwardly from the draft-tube 18, and if necessary, braced with tie rods, that are provided with sediment or sludge-impelling or plowing means, such as blades, rakes or edges 64, which incident to travel thereof adjacent the tank bottom or floor 11, impels sediment toward and into sludge sump 65, from which sediment can be discharged through pipe 66 and pump 67 downwardly through pipe 68 leading to a part 72 of the depressed sump 69.

Sump or wet-well 69 has in its bottom section an adjustable dam or weir 70 for forming a basin or pool 71 adapted for the sealing barometrically of the leg 14 of the scum-discharge duct system 13. In the part 72 of the sump 69, a pipe 73 reaches thereinto associated with which is a pump 74 for conveying the scum and sediment to further treatment or disposal. 76 indicates a pipe through which flows the impure or polluted liquid supplied for treatment. This pipe 76 delivers the liquid into a wet-well or sump 77, wherein the liquid passes under an adjustable curtain baffle 78. 79 indicates a gassing station or gas-diffusing means for causing gas or air to be dissolved and then entrained in the incoming liquid. In the drawings it is shown as a diffusing or gassing impeller on a shaft driven by a motor 80. 81 indicates a de-aerating or de-gassing flow-through passage or channel, in which there is an adjustable-height weir 82 over which the liquid cascades before entering the Vacuator feed pipe 19. This passageway 81 is for de-aerating the liquid to rid it of enlarged, entrained gas bubbles. 83 indicates a cover on the de-aerating passageway. 84 indicates a gate valve and means for operating it to open or close the entrance to the feed pipe 19. 85 indicates a junction box, and 86 a pipe, whereby the newly-incoming liquid can be by-passed around the Vacuator, if desired, since the pipe 86 joins into the sump 87, that is adjacent the pool 57. The discharge line 41 from the vacuum pump 35 also discharges into the sump 87, from which all liquid is discarded through the pipe 59.

It is to be observed that the inlet pipe 19 to the tank 10 has as its vertically-extending terminal the draft-tube 18. Under those circumstances, where it is desired to have the draft-tube rotatable, there is provided a liquid-tight slip-joint, as at 95, whereby the lower section of the rotatable draft-tube can rotate freely around the stationary upstanding end of the pipe 19 without loss of liquid therebetween.

As described in the Reissue Patent No. 22,701, to Kelly et al., the operation of the Vacuator is as follows:

The incoming new liquid to be treated therein first is to have gas, such as air, diffused therein. This is done in a gas-dissolving station, in the system illustrated by means of usual aeration by the use of an aerating impeller 101. Thereafter, the larger bubbles, and at least some entrained air, are de-aerated from the liquid in the passageway 81. The gas and de-aerated liquid then passes through the feed pipe 19 and upwardly in the draft-tube 18, due to the effect of vacuum within the main tank 10. There is maintained within the tank 10 an ever-changing body of liquid being treated, which reaches to a liquid level that is carefully controlled by means of the control assembly 30. The liquid rises in the control or secondary tank or compartment 30 through the pipe 33. The vacuum pump 35 in exerting a gas-exhausting suction through nozzles in the interior of the secondary tank 30 above the liquid level therein also produces a corresponding effect of vacuum in the upper section of the main tank 10 that is above its liquid level through the medium of the freely-communicating passageway or pipe 31 that extends between the upper sections of the main and secondary tanks. The liquid level in the secondary tank 30 is controlled through the adjustment of the nozzles, for the pump 35 in a wet-vacuum pump. If the liquid level tends to rise above the level of the nozzles in the tank 30, liquid is pumped therethrough until the liquid level in both tanks returns to normal. Any liquid sucked up by the pump 35 is discarded through pipe 41. It is to be noted that the minor body of liquid being treated that is hydrostatically contained within the secondary tank 30 is shielded from having any scum or floating material reaching it, because it is connected to the main tank at a point below which the scum has been released.

Liquid passes up the draft-tube in the main tank 10 and is emitted into the body of liquid in the tank at a diminished velocity, due to the flare 20 of the draft-tube 18. The velocity is diminished so that there is substantially no turbulence created above the draft-tube and its flare section, namely, in the liquid that is there located.

The tube type of delivery of feed liquid is for avoiding as much as possible dispersion or diffusion of the vacuum-floatable particles in the liquid body of the tank prior to realizing the lifting effect of vacuum on them.

The avoidance of turbulence, in this rather critical zone of vacuum action, is desirable, as turbulence is disadvantageous to flotation, since it tends to shake the bubbles loose from the solids to which the bubbles have become attached. As soon as the liquid is released from the draft-tube 18, the lessened pressure or effect of vacuum causes the dissolved and finely divided entrained gas in the liquid to come out of the solution, whereupon bubbles of gas are developed that cling to suspended solids encountered by the gas bubbles. In sewage and the like waste there is enough oil and grease on the suspended solids to act as an adhesive to cause the bubbles to adhere to the solids, whereupon the bubbles cause the solids to which they are attached to be buoyed up and to float to the liquid level. Accumulation of the floated solids forms a floating layer of scum.

It is desirable to continually remove the scum to leave the liquid level as free thereof as possible. To this end, the scum arms 26 are rotated with shaft 22 from motor 25. The scum arms with their sweeps push scum in front of them until the ramp 17 is encountered, when the sweeps, in riding up onto the ramp, push the scum before them and over the scum dam 15. The scum falls from or cascades over the dam into the funnel section 16 of the scum-removing duct means that includes the pipe 13, through which pipe plus its barometric leg 14 the scum is discharged from the main tank 10 and into the pool or basin 71 in a manner which prevents any air leakage into the tank 10 to otherwise spoil or diminish the vacuum therein.

Liquid from which the floated material has been removed is discarded from the tank as treated liquid or effluent through the effluent take-off assembly 50, by rising upwardly through the aperture 54 into the annular baffle space, from whence it flows to discharge through pipe 55, which also is a barometric leg, since it terminates in a pool 57, to prevent air leakage into the tank 10. The assembly 50 shields the drawn-off effluent from descending or settling solids, and the assembly is located at a depth in the tank at which the effect of vacuum is equal to the order of about 5 inches of mercury. It is the place or region where there is a minimum of suspended solids and a minimum of sedimented solids. In those cases where the Vacuator is to be used only to de-scum liquid to be treated, the effluent take-off will constitute the only other discharge duct from the tank besides the scum-removal duct. In such an instance, the effluent liquid will have entrained in it those suspended solids that have escaped or been immune to the flotation effects of vacuum.

The main features of operation of the Vacuator are fully described in the aforementioned Reissue Patent 22,701, to Kelly et al., the present invention being only concerned with that portion of the system wherein the sweeps 26 push scum in front of them onto the ramp, over the scum dam 15 and into the funnel section 16.

The sludge swept over the edge of weir 15 is quite concentrated in consistency and does not flow readily. If allowed to travel merely by gravity after being swept into the funnel section 16, the sludge would accumulate in said funnel section and block the scum discharge duct 13, causing the funnel section 16 to become filled and making the action of the sweep arms 26 useless. Consequently, there must be employed some means of inducing the sludge to flow down into the sump 69 at an adequate speed. This means forms the essential element of the subject matter of the present invention.

Designated at 111 is a large, downwardly-flaring spray head located over the funnel section 16 and connected by a conduit 112 through a valve 113 to a water supply pipe 114. Valve 113 is conventional in construction and includes a rotatable conical body 115 formed with a port 116. Body 115 is carried on a stem 117 which has secured to its outer end an arm 118. Pivotally connected at 120 to the arm 118 is a cylinder 119 containing a slidable plunger 121. Secured to plunger 121 is a rod 122 extending slidably through the end cap 123 of the cylinder. A heavy coiled spring 124 is positioned in cylinder 119, bearing between cap 123 and plunger 121, biasing the plunger to the right, as viewed in Figure 4. A weaker coiled spring 125 is positioned in cylinder 119 bearing between the transverse pin 120 and the plunger 121, said spring 125 acting to cushion movements of the plunger toward the pin 120.

The end of rod 122 is connected to a U-bracket 126. Designated at 127 is an upwardly-extending arm pivoted at 128 to the top wall 12 of the Vacuator tank. The intermediate portion of arm 127 extends between the arms of the U-bracket 126 and is pivotally secured thereto by a transverse pin 129. Secured to the shaft 22 in vertical alignment with the respective sweep arms 26 are the respective radially-extending arms 130, 130 which are engageable with the upper portion of the arm 127 responsive to the rotation of shaft 22, as shown in Figure 3. The ends of the arms 130 are slightly hooked, as shown at 131, to assure continuous engagement of the arms 130 with the arm 127 until arms 130 have moved past the top of arm 127, whereby arm 127 is rotated around its pivot 128 at a relative constant rate and is then suddenly released, the above action taking place each time an arm 130 engages the arm 127.

Valve 113 is held normally closed by the action of a spring 132 connected between the end cap 123 of cylinder 119 and the body of valve 113, as shown in Figure 3. When an arm 130 engages the upper portion of arm 127, arm 127 is rotated counterclockwise, as viewed in Figure 3, causing rod 122 to be moved to the left, the force on rod 122 being transmitted to cylinder 119 through plunger 121 and spring 124, and causing said cylinder to be likewise moved to the left. This rotates valve lever 118 counterclockwise, as viewed in Figure 3, opening valve 113. Water is admitted to spray head 111 and is discharged therefrom into the funnel section 16, flushing the sludge deposited in said funnel section down through the scum-discharge duct 13. As the arm 130 moves past the top of the arm 127, arm 127 is released, removing tension from rod 122, and allowing the spring 132 to rapidly close the valve 113, the force on valve lever 118 being cushioned by the action of spring 125.

The above flushing action takes place during a short period of time during each half-revolution of shaft 22 and immediately subsequent to the sweeping of a mass of sludge into the funnel section 16 by a rake arm 26. Therefore, the funnel section is automatically cleared of sludge and only enough water is employed to move the sludge downwardly from the funnel section into the scum-discharge duct 13. Since a relatively small amount of water is employed, overloading of the sump 69 by excessive dilution of the sludge is avoided, and the system may operate at maximum capacity at all times.

While a specific embodiment of an automatic spray system for a sewage-disposal plant of the Vacuator type has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a sludge-treatment plant of the character described, a sludge-separating tank, a vertical rotary shaft mounted in said tank, a discharge funnel section in said tank, a sweep arm carried by said shaft and arranged to sweep sludge into said funnel section, a spray head in said tank above the funnel section, conduit means connected to said spray head, a valve in said conduit means, and means driven by said shaft formed and arranged to open said valve for a short period of time each time the sweep arm sweeps sludge into said funnel section, said means embodying an operating lever operatively connected to said valve, an upstanding arm pivotally connected intermediate its ends to said lever, and another arm carried by said shaft and engageable during rotation of said shaft with the upper portion of said upstanding arm for a short period of time each time the sweep arm sweeps sludge into said funnel section.

2. In a sludge-treatment plant of the character described, a sludge-separating tank, a vertical rotary shaft mounted in said tank, a discharge funnel section in said tank, a sweep arm carried by said shaft and arranged to sweep sludge into said funnel section, a spray head in said tank above the funnel section, conduit means connected to said spray head, a normally-closed valve in said conduit means, an operating lever connected to said valve, an arm carried by said shaft, means biasing said lever toward valve-closing position, a rotary bar member, and link means connecting said bar member to said lever, said bar member being engageable by said arm for a relatively short period during the rotation of said shaft.

3. In a sludge-treatment plant of the character described, a sludge-separating tank, a vertical rotary shaft mounted in said tank, a discharge funnel section in said tank, a sweep arm carried by said shaft and arranged to sweep sludge into said funnel section, a spray head in said tank above the funnel section, conduit means connected to said spray head, a normally-closed valve in said conduit means, an operating lever connected to said valve, an arm carried by said shaft, said arm being in vertical alignment with the sweep arm, means biasing said lever toward valve-closing position, a bar member pivotally secured to said tank, and yieldable link means connecting said bar member to said lever, said bar member being engageable by said arm for relatively short periods during the rotation of said shaft.

RUSSELL V. FIPPS.

REFERENCES CITED

The following references are of record in the file of this patent:

UNITED STATES PATENTS

| Number | Name | Date |
|---|---|---|
| Re. 22,701 | Kelly et al. | Dec. 4, 1945 |
| T. M. 396,819 | The Dorr Co., Inc. | Aug. 4, 1942 |
| 2,115,202 | Kimball | Apr. 26, 1938 |
| 2,188,847 | Streander | Jan. 30, 1940 |

OTHER REFERENCES

American Sewerage Practice by Metcalf and Eddy, 3d ed., vol. III (1935), pages 300 and 301, McGraw-Hill, New York, N. Y.